United States Patent
Hall et al.

[19]

[11] Patent Number: 6,132,242

[45] Date of Patent: *Oct. 17, 2000

[54] DISTRIBUTION DEVICE FOR WIRING

[75] Inventors: Lawrence Alton Hall, Harrisburg; William John Schnoor, Hummelstown, both of Pa.

[73] Assignee: The Whitaker Corporation, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 09/004,158

[22] Filed: Jan. 7, 1998

Related U.S. Application Data

[60] Provisional application No. 60/034,025, Jan. 8, 1997.

[51] Int. Cl.[7] .................................................. H01R 13/60
[52] U.S. Cl. .......................... 439/532; 439/716; 361/822; 361/824
[58] Field of Search ..................................... 439/539, 716, 439/532; 361/16, 641, 644, 822, 823, 824

[56] References Cited

U.S. PATENT DOCUMENTS

| | | |
|---|---|---|
| 3,106,614 | 10/1963 | Stoehr et al. ............................ 379/120 |
| 3,173,738 | 3/1965 | Gluntz . |
| 4,220,391 | 9/1980 | Krolak et al. ........................... 339/126 |
| 4,477,047 | 10/1984 | Pelczarski ............................... 248/201 |
| 4,603,377 | 7/1986 | Kobayashi et al. ..................... 361/429 |
| 5,070,430 | 12/1991 | Meusel et al. .......................... 361/407 |
| 5,192,227 | 3/1993 | Bales ....................................... 439/532 |
| 5,276,279 | 1/1994 | Brownlie et al. ..................... 174/65 R |
| 5,764,490 | 6/1998 | Barbier et al. .......................... 361/823 |

*Primary Examiner*—Paula Bradley
*Assistant Examiner*—Truc Nguyen

[57] ABSTRACT

A distribution device (1) for distributed wiring is constructed with multiple modules (3) that have, respective disconnect hinges (14) mounted disconnectedly to a first rail (4) on a distribution backbone (2), and quick disconnect fasteners (11) disconnectedly secured to a corresponding other rail (4) on the distribution backbone (2).

5 Claims, 4 Drawing Sheets

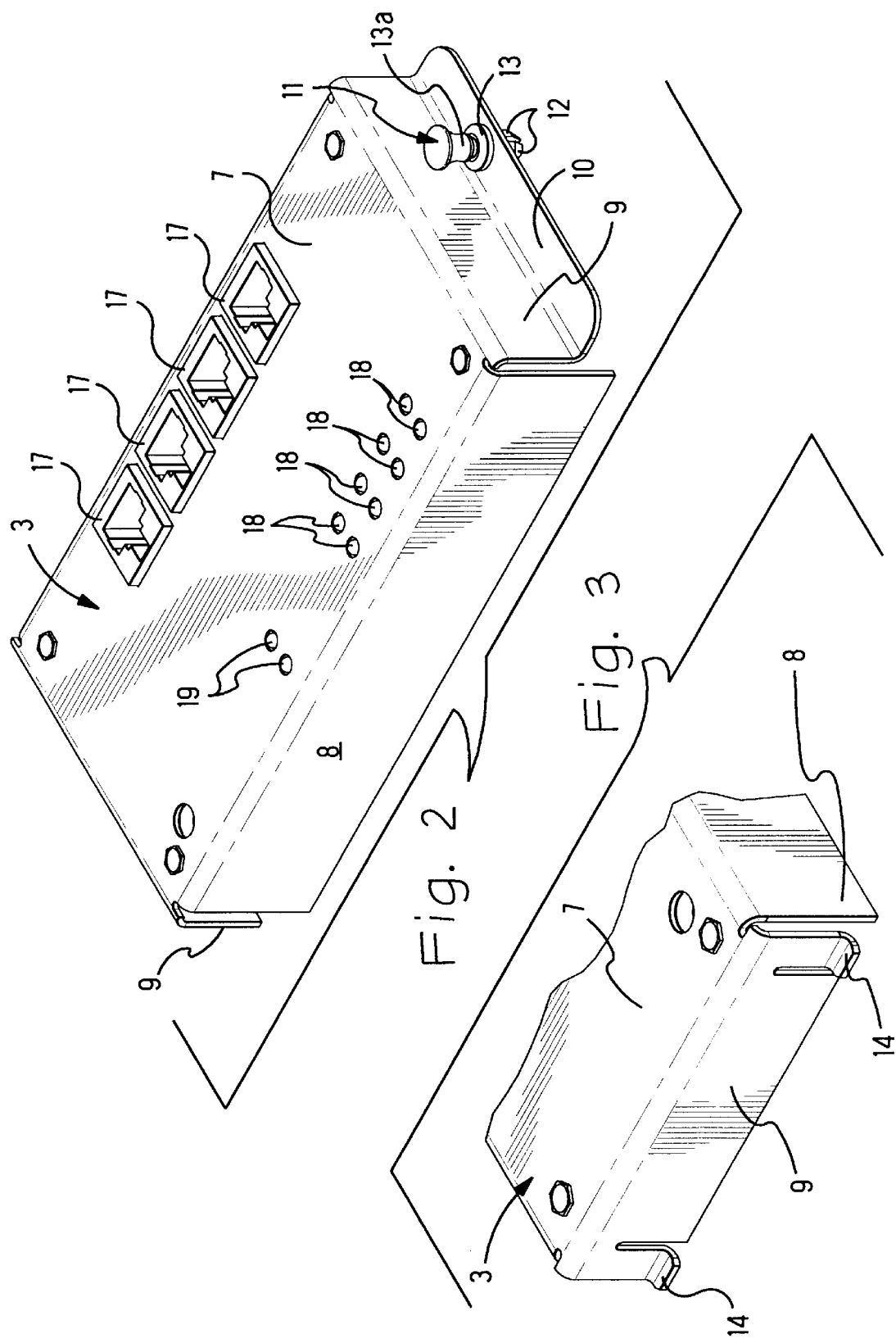

DISTRIBUTION DEVICE FOR WIRING

CROSS REFERENCE TO RELATED APPLICATION

This application claims the benefit of provisional application Ser. No. 60/034,025, filed Jan. 8, 1997.

FIELD OF THE INVENTION

The invention relates to a distribution device for connecting distributed wiring to incoming communications services and inside services, while integrating the inside and outside services.

BACKGROUND OF THE INVENTION

Existing homes are known to have telephone wiring throughout the whole house. Telephone wiring, which is one form of distributed wiring, provides convenient connection points for voice telephones. To activate the telephones, telephone service is supplied to the home by a service provider, such as a regulated utility or a variety of competing service providers. Now, and in the future, service providers will be joined by content suppliers to supply new forms of electronic commerce, such as, cable and satellite TV programs, computer communication and conversation services, remote photography, remote home automation, and many other types of interactive electronic commerce complete with images of persons and objects that can be manipulated with a home computer to provide the home with such services as, window shopping, demonstrating, training, giving lessons, answering questions, filling out forms, handling payments, deposits and withdrawals, and otherwise fulfilling a provider's role in a commercial transaction.

Incoming services to a home are delivered over service cables or transceivers or electronic busses, such as a Network Interface Device from a telephone company central office, which extend to a termination point at the home. Low voltage operating systems may need to be installed to activate the service for use throughout the home.

Other communications services throughout the home are supplied from inside sources within the home itself, autonomous of outside service providers, as for example, closed circuit video systems, local area network systems and home security systems.

To utilize the new services provided throughout the home, itself, both new and existing homes need a wiring infrastructure, comprised of different types of whole house distributed wiring. Different types of distributed wiring are needed to match the technical specifications for devices that deliver and convey the new services.

The distributed wiring within the home itself conveys the services throughout the home. The distributed wiring needs to be routed to the termination point of the incoming services and other system devices. A distribution device is required at the termination point to connect the distributed wiring with respective incoming services and other system devices.

For example, a distribution device comprises, a panel carrying a variety of electrical connectors, collectively referred to as, input jacks for incoming service cables and inside services cables, and output jacks for the distributed wiring, as well as, carrying electrical circuits and functioning electronics. Because the wiring infrastructure comprises different types of distributed wiring, such as electrical cables and optical fibers, the distribution device needs to be outfitted with different types of jacks that match the wiring.

Known distribution devices include, for example, the OnQ Structured Wiring System, available in different versions from AMP Incorporated, Harrisburg, Pa. One known version, the Series 100 Information Service Center, comprises, a box enclosure, and a panel with a hollow back that fits inside the enclosure. The panel carries an assortment of electrical connectors, collectively referred to as, input jacks for the terminated ends of service cables, and output jacks for the terminated ends of the wiring infrastructure. The hollow back of the panel covers the cables and other wiring that patches between the input and output jacks. The enclosure has a capacity for a single panel. A different panel is needed when different jacks are desired.

Other known versions, the Series 150 Information Services Center and the Series 200 Information Services Center, feature multiple panel capacity in a single enclosure, and industry standard hardware, EIA 19 inch rack and panel, to mount the multiple panels in the enclosure. The Series 200 Information Services Center has a space for a Control Services Module. The Control Services Module provides an interconnection panel for low voltage timing controls and settable controls for home automation of various systems, such as intruder security, lighting and HVAC equipment. Alternatively, the Control Services Module provides an interconnection panel for low voltage amplification and signal splitting or signal combining circuits. This module is in the form of I/O connectors on a cover plate that is bottom hinged against a bottom edge of an opening through a faceplate on the enclosure. The cover plate is secured by screws to the faceplate surrounding the faceplate opening that is sized to be slightly smaller than the perimeter of the cover plate.

SUMMARY OF THE INVENTION

The invention resides in a distribution backbone for mounting multiple modules wherein, each of the modules is tailored with a desired assortment of electrical connectors herein referred to as input and output jacks. Each of the modules comprises, quick mounting features for quick installation to the distribution backbone. An advantage is quick installation of the modules to a distribution backbone.

A mounting feature of each of the modules comprises, at least one disconnectable hinge for attachment to one of the rails, and at least one disconnectable fastener for attachment to another of the rails.

The distribution backbone comprises, multiple spaced apart rails along a backboard. Each of the modules bridges between the rails, and connects to the rails with a quick installation features.

Another feature resides in adapting the distribution backbone with modules of various sizes. Each of the modules has a width that bridges between two rails, or, alternatively, a width that bridges between more than two rails. Each of the modules bridges across two rails, and are adaptable in different sizes to bridge across more than two rails, which provides adaptability of different modules of different sizes to fit communications systems having system interface devices of different sizes.

Another feature of the modules resides in adapting the modules with various lengths along the rails. The modules extend along the rails, and are adaptable with longer dimensions to extend along the rails.

Another feature of the backbone comprises a mounting structure for mounting a variable combination of modules having different sizes. The backbone allows a variable combination of different modules to be mounted closely together.

Another feature resides in a mounting structure that allows mounting of a module in various positions along the mounting structure.

DESCRIPTION OF THE DRAWINGS

Embodiments of the invention will now be described by way of example with reference to the accompanying drawings, according to which:

FIG. 2 is an isometric view of a module;

FIG. 3 is a fragmentary isometric view of a portion of a module;

DETAILED DESCRIPTION

Figure 1:
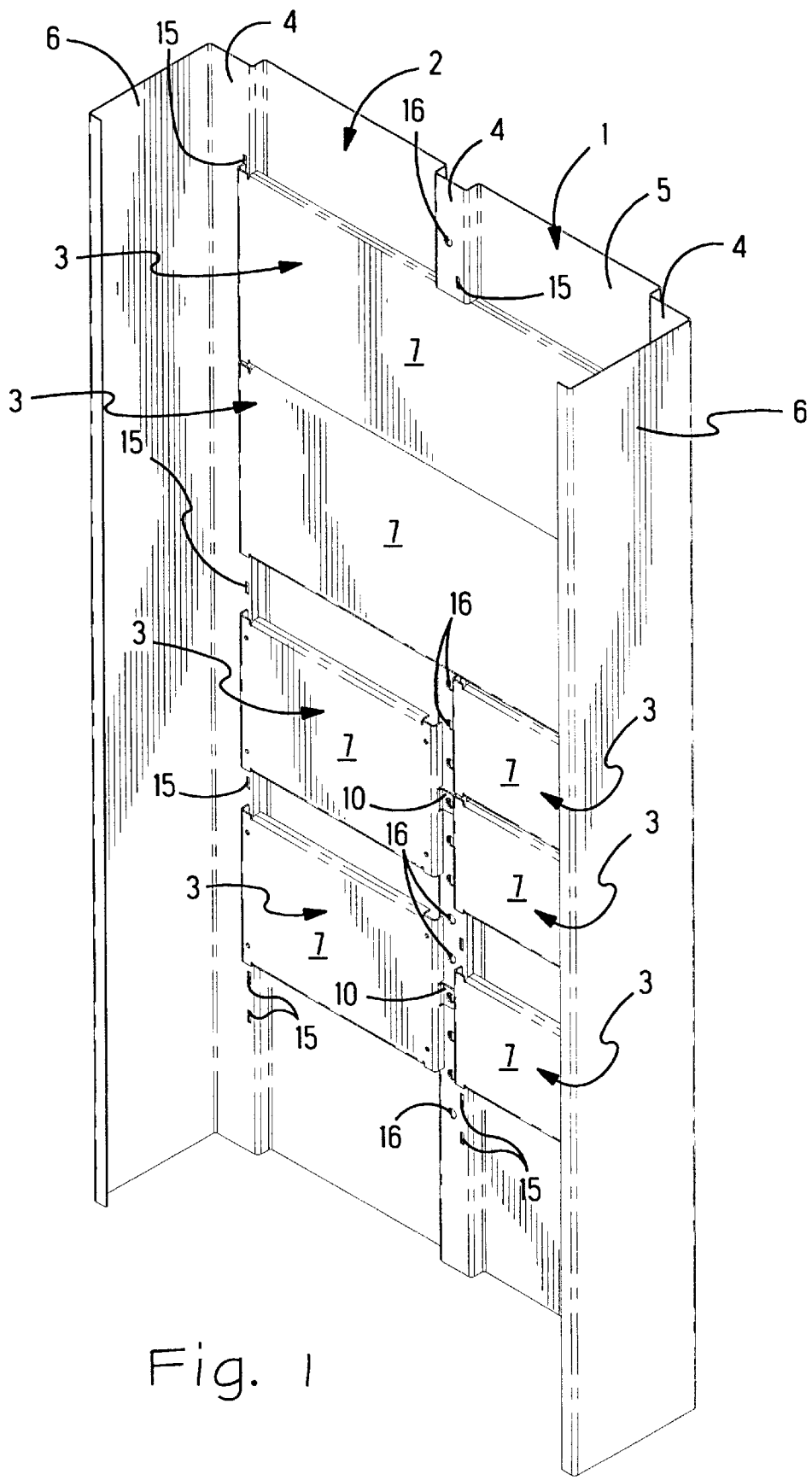
FIG. 1 is an isometric view of a backbone of a distribution device, together with modules in blank form on the backbone.

With reference to FIG. 1, a distribution device 1 comprises, a distribution backbone 2 for mounting multiple modules 3. A feature of the distribution backbone 2 resides in a number of spaced apart rails 4 along a backboard 5. For example, a continuous sheet of metal is stamped and formed, with the metal being bent to project the rails 4 unitary with, and outward from, the backboard 5. The thickness of the sheet of metal forms the plane of the backboard 5 and the plane of each of the rails 4. The sheet of metal is further formed with sidewalls 6 projecting outward from the plane of the backboard 5 to form an enclosure that contains the rails 4 and the backboard 5. The invention pertains to other constructions of the rails 4 and the backboard 5, for example, a separate backboard 5, and the rails 4 being mounted on the backboard 5.

With reference to FIGS. 1–5, different embodiments of the modules 3 will now be described. Each of the modules 3 comprises a front facing panel 7. For example, a continuous sheet of metal forms the front facing panel 7. As shown in FIG. 1, for example, one panel 7 is shown flush with the top of three respective rails 4, and can be adapted as a mounting panel for a circuit board, not shown. Alternatively, instead of a flush panel 7, other modules 3, shown in FIG. 1, bridge between two of the rails 4. These modules 3 can be provided with a hollow back that is formed by the corresponding sheet of metal being bent to form sides 8 and endwalls 9 that are unitary with the panel 7. The hollow back can be adapted to cover a circuit board, not shown. A back plate 7a, FIG. 5, covers the hollow back, and faces toward the rails 4 when the corresponding module 3 is mounted to the rails 4. The back plate 7a cooperates with the front facing panel 7 to provide a can for containing a circuit board, not shown, and electrical components, not shown. For example, circuit boards of different sizes are used to mount low voltage receivers, switches and other low voltage devices.

A flange 10 on one of the endwalls 9 has an opening through which a fastener 11 is received and captivated. At least one fastener 11 is needed for each module 3. With reference to FIG. 3, each of the modules 3 has projecting hinge tabs 14 that are struck out of a corresponding endwall 9. The hinge tabs 14 are located at regularly spaced intervals.

A feature resides in adapting the distribution backbone 2 with modules 3 of various sizes. Each of the modules 3, as shown in FIGS. 1–5, has a width that bridges between at least two rails 4. Alternatively, a module 3 having a wider width, as in the module 3 shown in FIG. 5, bridges between more than two rails 4. Thus, each of the modules 3 bridges across two rails 4, and in a different, larger size, bridges across more than two rails 4.

Figure 4:
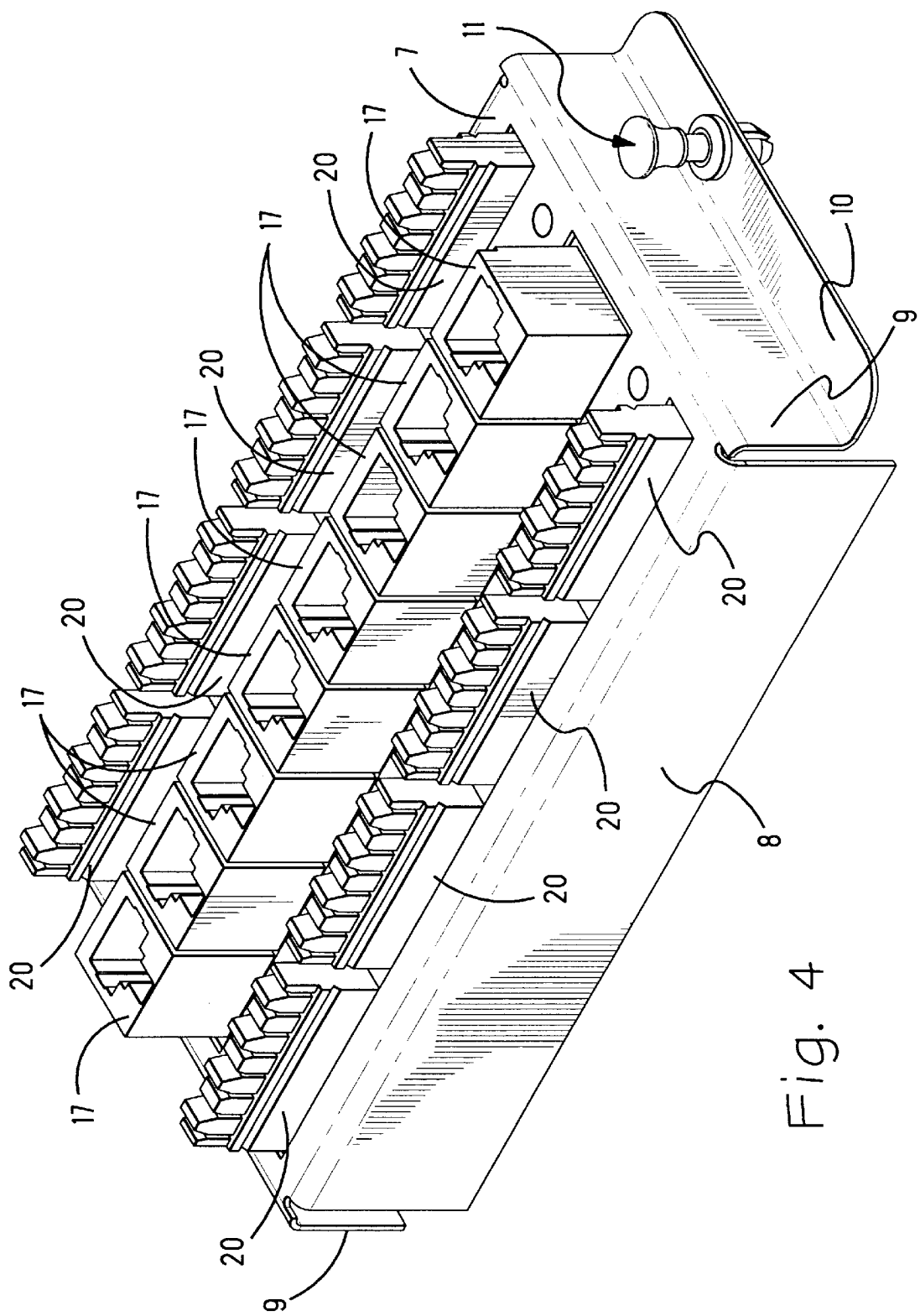
FIG. 4 is an isometric view of another module.
Figure 5:
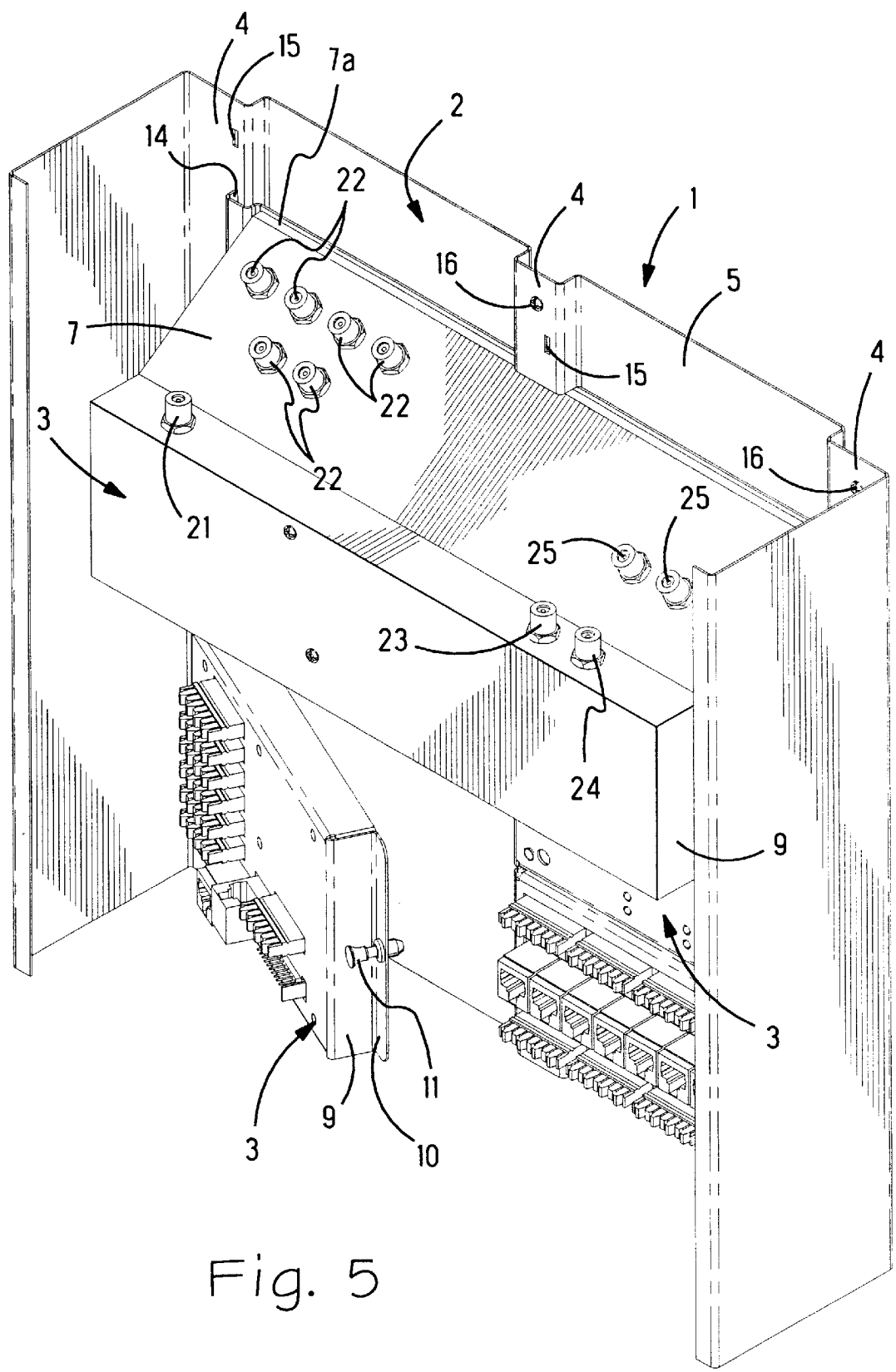
FIG. 5 is an isometric view of the backbone, together with the modules, as shown in FIGS. 2, 3 and 4, together with another, larger module.

Another feature of the modules 3 resides in adapting the modules 3 with various lengths, extending vertically along the rails 4, according to FIGS. 1 and 4. The modules 3 extend lengthwise along the rails 4, and are adaptable with different dimensions to extend further or closer along the rails 4. For example, the module 3 as shown in FIG. 5, has a longer length in a vertical direction, than the modules 3, as shown in FIGS. 2 and 4.

The various modules 3 provide various low voltage devices adapted for different incoming systems supplied by the service providers and content providers, as well as, internal services that are autonomous from incoming services. These internal services are needed to activate the corresponding services for use throughout the home, much as telephone service needs to be activated for use throughout the home. Because the modules can vary, both in width and length, these low voltage devices can be mounted on a circuit board of desired size and fitted to a module 3 of a desired size. An advantage resides in adaptability of different modules 3 that are sized to different systems and systems devices. Further, the invention provides a distribution panel to which modules of different sizes are mounted.

A feature of the backbone 2 comprises a mounting structure for mounting a variable combination of modules 3 having different sizes. The backbone 2 allows a variable combination of different modules 3 to be mounted closely together. A first rail 4 is provided with a series of spaced apart slots 15, FIG. 1, into which the projecting tabs 14 of any module 3 are inserted to provide a hinge connection. The slots 15 are located at regularly spaced intervals matched to the internal spacing of the tabs 14. The hinge connection provides a quick release connection. Further, the hinge connection allows the module 3 to pivot on the hinge connection, as shown in FIG. 5, for movement of the hollow back of the module 3 toward the back panelboard 5. A second rail 4 is provided with sockets 16, located at regularly spaced intervals, into which a corresponding quick release fastener 11 secures to mount any of the modules 3 of narrower width, such as the modules 3 according to FIGS. 2 and 4. A third rail 4 is provided with similarly spaced sockets 16 into which corresponding quick release fasteners 11 secure to mount any of the modules 3 of wider width, such as the module 3 according to FIG. 5.

For example, one form of the fastener 11 has a set, such as, for example, a pair of spring prongs 12 that pass through the flange 10 to register within a corresponding socket 16 in a rail 4. The spring prongs 12 spring apart to resist withdrawal from the socket 16. An enlarged head 13 on the quick release fastener 11 resists further passage through the flange 10. A spring loaded plunger 13a telescopes with the remainder of the fastener to spread the prongs 12 and provide a force fit in the socket 16. The plunger 13a can be partially withdrawn from a remainder of the fastener 11 to release the prongs 12 and remove the fastener from the socket 16 in preparation to remove the module 3 from the rails 4.

The series of slots 15 and the corresponding sockets 16 that are spaced to correspond with that of the slots 15, resides in a mounting structure that allows mounting of a module 3 in various positions along the mounting structure.

Further shown in FIG. 5, any of the modules 3 of narrower width can bridge between the second rail 4 and the third rail 4. As shown in FIG. 5, the module 3, shown in FIG. 4, bridges between the second rail 4 and the third rail 4. Accordingly, the second rail 4 is provided with a series of spaced apart slots 15, at regularly spaced intervals, into which the tabs 14 of a corresponding module 3 are plugged to serve as a hinge connection to allow pivoting of the corresponding module 3 to bridge between the second rail 4 and the third rail 4. The quick release fastener 11 on the corresponding module 3 releasably secures in one of a series of spaced apart sockets 16 in the third rail 4.

FIG. 1 discloses the modules 3 before adapting the modules 3 with electrical connectors. Each of the modules 3 can be tailored with a desired assortment of electrical connectors, herein referred to as, jacks, which are mounted through the panel 7. For example, with reference a network hub module 3, FIG. 2, and a network interface module 3, FIG. 4, together provide a local area network for a building, for example, a residence. The network hub module 3 of FIG. 2 adapts active electronics of a 10BASE-T Ethernet hub for containment in a suitable configuration of module 3, according to the invention. The network hub module 3 has a front panel 7 with multiple electrical connectors 17 in the form of known RJ45 telephone jacks. The telephone jacks conform to the technical specifications promulgated by the Federal Communications Commission for the National Telephone System. Four telephone jacks are provided to provide a corresponding number of four network ports.

The network interface module 3, FIG. 4, provides insulation displacing, electrical connectors 20, known as 110 blocks, for connecting four twisted pair, insulated wires of LAN communication cables that comprise distributed cables that extend to various rooms of the building. Such cables are known as Category 5 or CAT 5 cables, and are wired to plug in outlets in the various rooms. The outlets provide Ethernet ports into which cables are plugged, such cables being used to plug computers and peripheral devices into the outlets for communicating with one another over the distributed communication cables of network. Multiple electrical connectors in the form of telephone jacks correspond in number to the telephone jacks 17 in the network hub module 3. Jumper cables, not shown, connect between the telephone jacks on the network interface module 3 and corresponding telephone jacks on the network hub module 3.

With reference to FIG. 2, low voltage pilot lights 18, for example, LEDs, light emitting diodes, are mounted in the panel 7. Each jack 17 is coupled with a pair of LEDs that will illuminate to indicate the respective input and output signal flow in the input and output directions. An additional pair of LEDs 19 will illuminate to indicate respective signal flow in an input service cable, not shown.

With reference to FIG. 5, another embodiment of a module 3 will now be described. The module 3 comprises a panel 7 of wider width than that of the panels 7 of FIGS. 2 and 4. The module 3 comprises multiple jacks in the form of coaxial connectors, such as the known "F" connectors, mounted through the panel 7. The wider module 3 is in the form of a video distribution module 3 that contains the necessary components, including bidirectional and single directional amplifiers, to distribute video signals over RF cables, not shown, to corresponding rooms of a building, for example, a residence. Such cables are connected to output jacks 22 to distribute the same video signal to the corresponding rooms. Any number of output jacks 22 are provided, although six are shown.

Further, the video distribution module 3 integrates outside video services and inside video services. An outside video service includes television signals from a service provider, for example, a local television station, or, for example, a VHF/UHF television antenna that feeds one way or two way signals over wiring, for example, RF cables, extending to corresponding rooms of a building. The input jack 21 provides the connection point for such outside video services.

An inside video service includes closed circuit video signals provided by a video cameras or a video cassette player of video disc layer to a video modulator, not shown, and from there to an input jack 21. The module 3 cross connects the input jack 21 to the output jacks 22, to which are connected the RF cables that extend to corresponding rooms of a building, such as a residence, for example.

Another outside video service includes digital video satellite broadcasts in conjunction with satellite antennas coupled with set top boxes and with the RF cables that extend to the corresponding rooms. Input jacks 23, 24 provide the connection points for the incoming digital video satellite broadcasts. The input jacks 23, 24 are adapted for a digital satellite antenna with one low noise blocker, LNB, or two, connecting with corresponding satellite receivers, each of which is known as a set top box. The LNB is matched to a set top box in a corresponding room that provides for single direction or bidirectional channels of signal communication. Output jacks 25 on the video distribution module provide the outputs to the set top boxes.

The video distribution module 3 can have a variable number of input jacks 21, 23, 24, and a variable number of output jacks 22, 25. The video distribution module integrates the outside services with the inside services, and provides a convenient cross connection point for RF cables that distribute the integrated video services to the corresponding rooms of a building, for example, a residence.

Each of the modules 3 comprises, quick release mounting features for disconnectedly mounting to the distribution backbone 2. An advantage is quick connection and disconnection of the modules 3 to the distribution backbone 2. A quick disconnect feature of each of the modules comprises, at least one disconnect hinge 14 for attachment to one of the rails 4, and at least one disconnect fastener 11 for attachment to another of the rails 4.

Although different embodiments of the invention have been described, other embodiments and modifications are intended to be covered by the spirit and scope of the claims, herein.

What is claimed is:

1. A distribution device for distributed wiring comprising:

a distribution backbone, multiple modules, each of said modules having a panel carrying electrical connectors, each of said modules having a disconnect hinge adapted to disconnectedly secure to a first rail on said distribution backbone, each of said modules having a quick disconnect fastener, each disconnect fastener being adapted to disconnectedly secure to a corresponding other rail on said distribution backbone, each said module is either a module of a narrower width or a module of a wider width, and said corresponding other rail comprises, one of either a second rail, to which each said module of a narrower width disconnectedly connects, or a third rail, to which each said module of a wider width disconnectedly connects, and each said module of a wider width bridging across the first rail and the second rail and the third rail.

2. The distribution device as recited in claim 1, and further comprising:

each said module of a narrower width being adapted to bridge across the first rail and the second rail while having said disconnect hinge disconnectedly secured in the first rail and while having said quick disconnect fastener disconnectedly secured in the second rail, and each said module of a wider width bridging across the first rail and the second rail and the third rail while having said disconnect hinge disconnectedly secured in the first rail and while having said quick disconnect fastener disconnectedly secured in the third rail.

3. The distribution device as recited in claim 1, and further comprising:

multiple slots in the first rail, each said module of a narrower width having said disconnect hinge disconnectedly secured in one of the multiple slots in the first rail, each said module of a wider width having said disconnect hinge disconnectedly secured in one of the multiple slots in the first rail, multiple sockets in the second rail, each said module of a narrower width having said quick disconnect fastener adapted to be disconnectedly secured in one of the multiple sockets in the second rail, and multiple sockets in the third rail, each said module of a wider width having said quick disconnect fastener disconnectedly secured in one of the multiple sockets in the third rail.

4. The distribution device as recited in claim 1, and further comprising:

multiple slots in the first rail, multiple sockets in the second rail, each said module of a narrower width being adapted to bridge across the first rail and the second rail while having said disconnect hinge disconnectedly secured in one of said multiple slots in the first rail and while having said quick disconnect fastener disconnectedly secured in one of said multiple sockets in the second rail, multiple slots in the second rail, and multiple sockets in the third rail, each said module of a narrower width being adapted to bridge across the second rail and the third rail while having said disconnect hinge disconnectedly secured in one of said multiple slots in the second rail and while having said quick disconnect fastener disconnectedly secured in of the multiple slots in the third rail, and each said module of a wider width being adapted to bridge across the first rail and the second rail and the third rail while having said disconnect hinge disconnectedly secured in one of said multiple slots in the first rail and while having said quick disconnect fastener disconnectedly secured in one of the corresponding multiple sockets in the third rail.

5. The distribution device as recited in claim 1, and further comprising: the distribution backbone includes a backboard continuous with each of said first rail and said second rail and said third rail.

* * * * *